(No Model.)

J. W. FREE.
HEAT RADIATOR FOR BURNERS.

No. 455,543. Patented July 7, 1891.

WITNESSES:

INVENTOR:
John W. Free
By Henry Connett
Attorney.

UNITED STATES PATENT OFFICE.

JOHN W. FREE, OF NEW YORK, N. Y.

HEAT-RADIATOR FOR BURNERS.

SPECIFICATION forming part of Letters Patent No. 455,543, dated July 7, 1891.

Application filed November 4, 1889. Serial No. 329,176. (No model.)

*To all whom it may concern:*

Be it known that I, JOHN W. FREE, a citizen of the United States, residing in the city, county, and State of New York, have invented certain Improvements in Heat-Radiators for Burners, of which the following is a specification.

My invention relates to the class of portable heating devices wherein the heated gaseous products from the burner follow an upward zigzag or tortuous passage formed by heat-conducting baffles in the body of the heater; and the object of the invention is to provide a cheap, simple, and portable heater adapted to be mounted on an illuminating-burner, and especially on an illuminating gas jet or burner.

Another object of my invention is to provide such a heater with an annular reflector, whereby the illuminating effect of the heating-burner is enhanced and used to better advantage.

In the accompanying drawings illustrative of my invention I have shown it embodied in a heater for a room adapted to be mounted on the burner of an ordinary gas-bracket.

Figure 1:
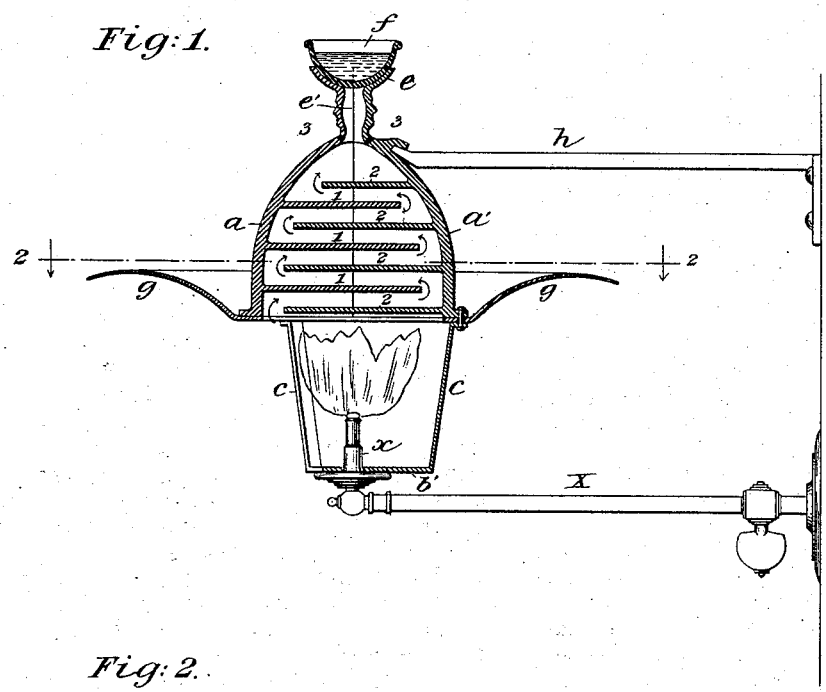
Figure 2:
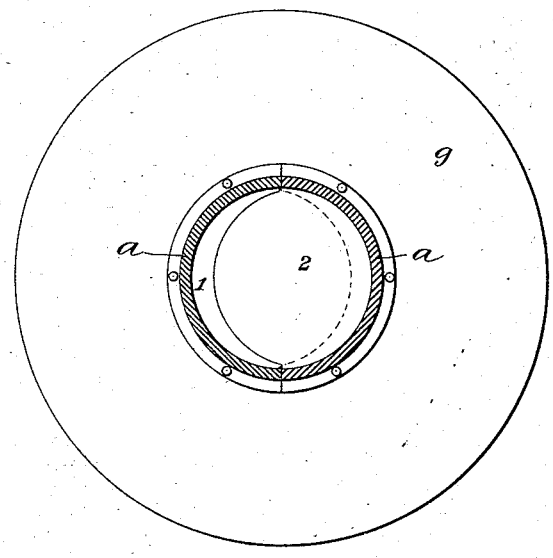
Figure 3:
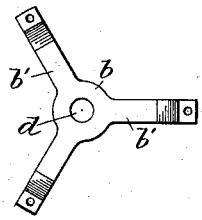

Figure 1 of the drawings is a vertical mid-section of the heater represented as mounted on the burner of a gas-bracket. Fig. 2 is a horizontal section of the same in the plane indicated by the line 2 2 in Fig. 1. Fig. 3 is a plan view of the foot or support of the heater.

In the drawings, X represents an ordinary gas-bracket, and $x$ the pillar of the burner thereon. The body of the heater will be made, preferably from cast metal, in two sections $a$ $a'$. The section $a$ will be provided with baffle-plates 1 1, and the section $a'$ will be provided with similar baffle-plates 2 2. These plates project from the inner faces of the respective sections, and when the latter are fitted and secured together face to face, as seen in Fig. 1, the plates 1 and 2 will alternate with one another in such a manner as to form a zigzag or tortuous passage, as indicated by the arrows. The heater has a foot or support consisting of a central boss $b$, with two or more radial arms $b'$, and uprights $c$, connecting these radial arms with the body of the heater. In the boss $b$ is an aperture ($d$ in Fig. 3) through which the pillar of the burner is passed when the heater is mounted thereupon.

When the gas is ignited, the hot gases resulting from the combustion thereof rise and enter the heater, following the zigzag passage about the baffle-plates 1 and 2 therein. A current is established through the heater by means of apertures 3, one or more in the upper part or apex of the heater. These apertures should not be so large as to allow the heated gases to escape too rapidly, as it is important that the gases shall be retained long enough to heat the walls and baffle-plates of the heater very hot.

The heater will be provided, preferably, with a support $e$ for a dish or cup $f$ to hold water for heating. This support has a passage $e'$ through it for the gases, and the vessel $f$ is adapted to close this passage when mounted on its support.

The uprights $c$, which support the body of the heater, will be too slender to offer much obstruction to the light from the burner, and to reflect the light downward I provide the heater with an annular reflector $g$, preferably secured to the body thereof, as shown. In assembling the parts I prefer to rivet the reflector $g$ and the upper ends of the uprights $c$ to a base-flange on the heater-body.

Where the heater is intended to be used on a gas-bracket, as herein shown, it may be braced and steadied by a bracket $h$, the end of which will engage or take under some portion of the heater, as shown. The particular manner of supporting the heater over the burner is not essential to my invention and will vary with the character of the burner.

My heater is not limited in its application to gas-burners, although I prefer to use this kind of burner with it where gas is accessible.

The object or purpose of my heater is to warm the air of a room that is not otherwise heated, and it is adapted to be removed from the burner in a moment and placed on another in a different room, if desired. Being light and portable, it may be carried by travelers and used for warming hotel-rooms.

The dome-like cylindrical form of the heater-body is the best form with which I am acquainted at present; but I do not limit myself to any special form or contour therefor nor to any particular size. I may also use other kinds of burners than gas-burners with my heater—as a kerosene-burner, for example—and more than one burner may be employed with my heater.

Having thus described my invention, I claim—

1. A heater or heating device adapted to be supported over a burner, and consisting of a hollow body of metal in the form of an inverted cup made in two sections $a$ and $a'$, the section $a$ having integral baffle-plates 1 formed on it, and the section $b$ having integral baffle-plates 2 formed on it, the said baffle-plates 1 and 2 alternating, as set forth.

2. The combination, with the heater-body having the form of an inverted cup and made in two sections $a$ and $a'$, provided internally with the respective baffle-plates 1 and 2, of the support whereby said body is mounted on the burner, and the annular concavo-convex reflector $g$, secured to the lower edge of the heater-body.

In witness whereof I have hereunto signed my name in the presence of two subscribing witnesses.

JOHN W. FREE.

Witnesses:
HENRY CONNETT,
J. D. CAPLINGER.